United States Patent Office 3,192,265
Patented June 29, 1965

---

3,192,265
PROCESS FOR THE MANUFACTURE OF CYCLODECANOL-(1)-ONE(6)
Walter Zehnder and Kaspar Ryffel, both of Domat-Ems, Switzerland, assignors to Inventa A.G. für Forschung und Patentverwertung, Zurich, Switzerland
No Drawing. Filed July 20, 1961, Ser. No. 125,341
Claims priority, application Switzerland, July 23, 1960, 8,380/60
2 Claims. (Cl. 260—586)

Decalin (decahydronaphthalene) can be used as a cheap and easily available starting product for ω-capric lactam which can be polymerized to the technically valuable Polyamide 10 (see A. Müller and R. Pflüger, Kunstoffe 50, 1960, page 205). From this the ω-capric lactam is obtained in a multi-stage process as follows, wherein the Roman numerals refer to the formulae listed below:

(a) Oxidation of the Decalin (I) to Decalin peroxide (II), and esterification with acetic acid anhydride, (b) Re-arrangement of the decalol peracetate (III) to the acetate of 1-oxy-1,6-oxide-cyclodecane (IV), (c) Alkaline saponification of this acetate to cyclodecanol-(1)-one(6) (V) which can be converted in a known manner to cyclodecanone (VI), (d) Oximation of the cyclodecanone and conversion by the Beckmann re-arrangement of the oxime to ω-capric lactam (VIII).

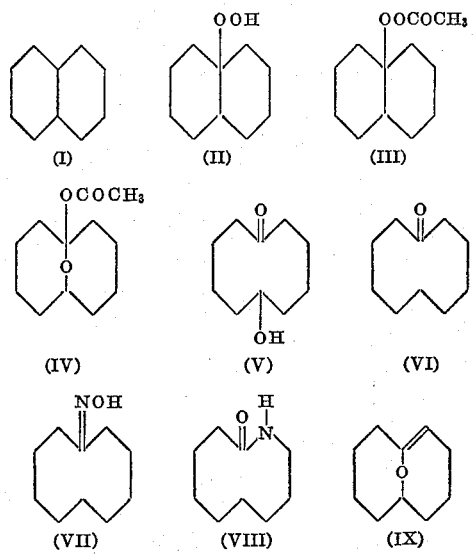

A process has now been discovered by which this known synthesis of ω-capric lactam is considerably simplified in that the hydroxy ketone (V) is made directly from the peroxide (II) by a single-stage reaction (see example) and the roundabout method through the peracetate (III) and the oxide compound (IV) is unnecessary.

The process of the invention for the manufacture of cyclodecanol-(1)-one(6) from a decalin peroxide is characterized by effecting the transposition with the aid of acid catalysts.

If the decalin peroxide (II) is treated in the presence of water with acid transposition catalyst, the hydroxy ketone (V) is formed directly.

The invention now will be further illustrated by the following example. However, it should be understood that these are given merely by way of explanation, not of limitation, and that numerous changes may be made in the details without departing from the spirit and the scope of the invention as hereinafter claimed.

*Example*

5.0 g. Decalin peroxide are dissolved in 375 ml. 67% acetic acid, and the solution is heated to boiling for 2 hours using a reflux condenser. After cooling, it is evaporated to dryness under vacuum (pressure 30 mm. Hg, maximum temperature 40° C.). Crude cyclodecanol-(1)-one(6) is obtained from the distillation residue by extraction with water. The cyclododecanolone can be recrystallized from cyclohexane to a pure product having a melting point of 69–70° C. (lit. 70° C.). The yield amounts to 2.65 grams, corresponding to 53% of the theory.

We claim as our invention:

1. A process for the manufacture of cyclodecanol-(1)-one(6), which comprises refluxing decahydronaphthalene peroxide in an excess of aqueous acetic acid, cooling, evaporating to dryness in a vacuum, and extracting the residue with water thus obtaining crude cyclodecanol-(1)-one(6).

2. A process for the manufacture of cyclodecanol-(1)-one(6), which comprises refluxing decahydronaphthalene peroxide for 2 hours in an excess of aqueous acetic acid, cooling, evaporating to dryness at a temperature not exceeding 40° C. and at a vacuum of substantially 30 mm. Hg, extracting the residue with water thus obtaining, by molecular re-arrangement, crude cyclodecanol-(1)-one (6).

References Cited by the Examiner

Bartlett et al.: J. Am. Chem. Soc., vol. 75, pp. 5591–5 (1953).
Criegee: Ber. Deut. Chem., vol. 77, pp. 722–6 (1944).
Holmquist et al.: J. Am. Chem. Soc., vol. 78, pp. 5339–41 (1956).

LEON ZITVER, *Primary Examiner.*